(12) United States Patent
Kunau

(10) Patent No.: US 8,752,604 B2
(45) Date of Patent: Jun. 17, 2014

(54) JET ASSISTED TUBELESS TIRE SEATING DEVICE

(75) Inventor: Daniel Kunau, Boone, CO (US)

(73) Assignee: Gaither Tool Company, Inc., Jacksonville, IL (US)

(*) Notice: Subject to any disclaimer, the term of this patent is extended or adjusted under 35 U.S.C. 154(b) by 808 days.

(21) Appl. No.: 13/018,383

(22) Filed: Jan. 31, 2011

(65) Prior Publication Data

US 2011/0253317 A1 Oct. 20, 2011

Related U.S. Application Data

(60) Provisional application No. 61/342,316, filed on Apr. 14, 2010.

(51) Int. Cl.
*B60C 25/00* (2006.01)
*B60B 31/00* (2006.01)
*B60C 25/14* (2006.01)
*B60C 25/132* (2006.01)
*B60S 5/04* (2006.01)

(52) U.S. Cl.
CPC .............. *B60B 31/005* (2013.01); *B60C 25/147* (2013.04); *B60C 25/132* (2013.01); *B60S 5/04* (2013.01)
USPC ................................ 157/1; 157/1.1; 157/1.17

(58) Field of Classification Search
CPC .... B60B 31/005; B60C 25/00; B60C 25/147; B60C 25/145; B60C 23/00; B60C 25/132; B60S 5/04
USPC ............................................ 157/1, 1.22, 5, 8
See application file for complete search history.

(56) References Cited

U.S. PATENT DOCUMENTS

| 5,072,764 | A | 12/1991 | Ochoa |
| 5,168,911 | A | 12/1992 | Gottschalk |
| 5,456,302 | A | 10/1995 | Demers |
| 5,509,456 | A | 4/1996 | Bonko et al. |
| 5,570,733 | A | 11/1996 | Deparois et al. |
| 5,878,801 | A | 3/1999 | Ellis |
| 5,884,659 | A | 3/1999 | Prosser et al. |
| 6,179,033 | B1* | 1/2001 | Demers ............... 157/1.17 |
| 7,000,667 | B2 | 2/2006 | Brahler |
| 7,017,642 | B2 | 3/2006 | Brahler |
| 2003/0041901 | A1* | 3/2003 | Gonzaga ............. 137/224 |
| 2003/0178151 | A1 | 9/2003 | Ritchie et al. |
| 2011/0247760 | A1* | 10/2011 | White ................ 157/1.17 |

FOREIGN PATENT DOCUMENTS

EP 0408921 A1 1/1991

* cited by examiner

*Primary Examiner* — Monica Carter
*Assistant Examiner* — Melanie Alexander
(74) *Attorney, Agent, or Firm* — Brevetto Law Group

(57) ABSTRACT

A nozzle for seating a tubeless tire on a rim using pressurized gas includes an outlet, a jet configured to accept pressurized gas and emit a stream of gas through an orifice into a chamber. As the stream of gas enters the chamber, the Venturi effect causes air to enter the chamber through air intake ports and the stream of gas and air from the air intake ports is blown out of the outlet of the nozzle. A system for seating a tubeless tire on a rim includes the nozzle, a tank and a valve configured to control the flow of pressurized gas from the tank to the nozzle. The tire may be seated on the rim by positioning the system so that the air from the nozzle blows into the tire between the bead of the tire and the rim if the valve is opened.

19 Claims, 6 Drawing Sheets

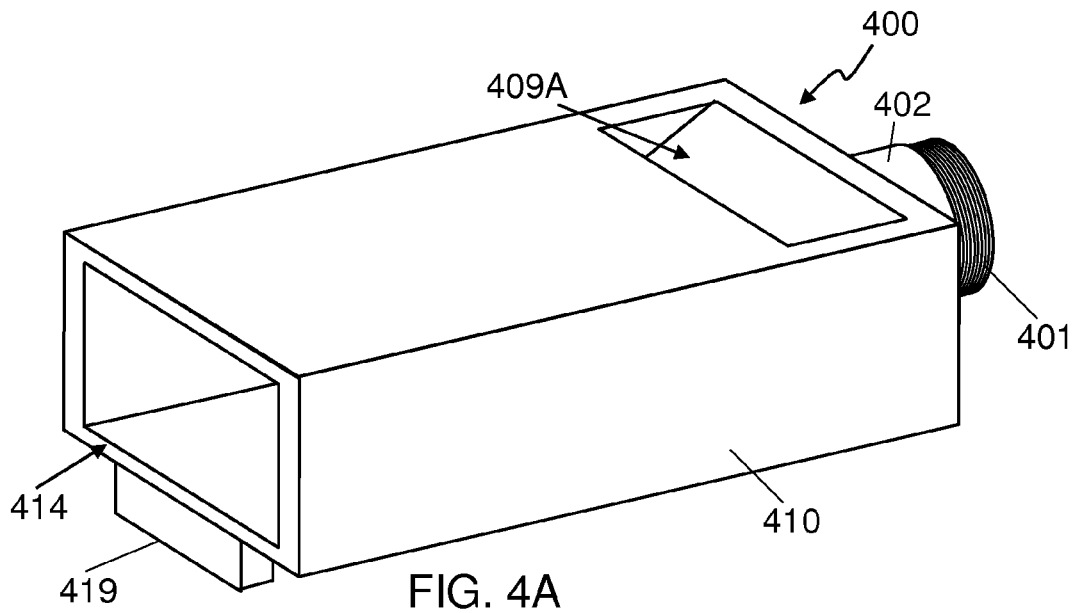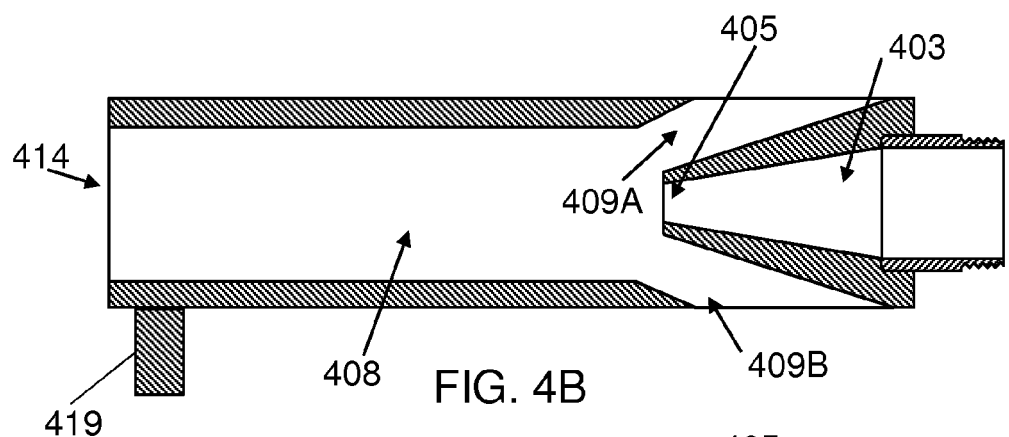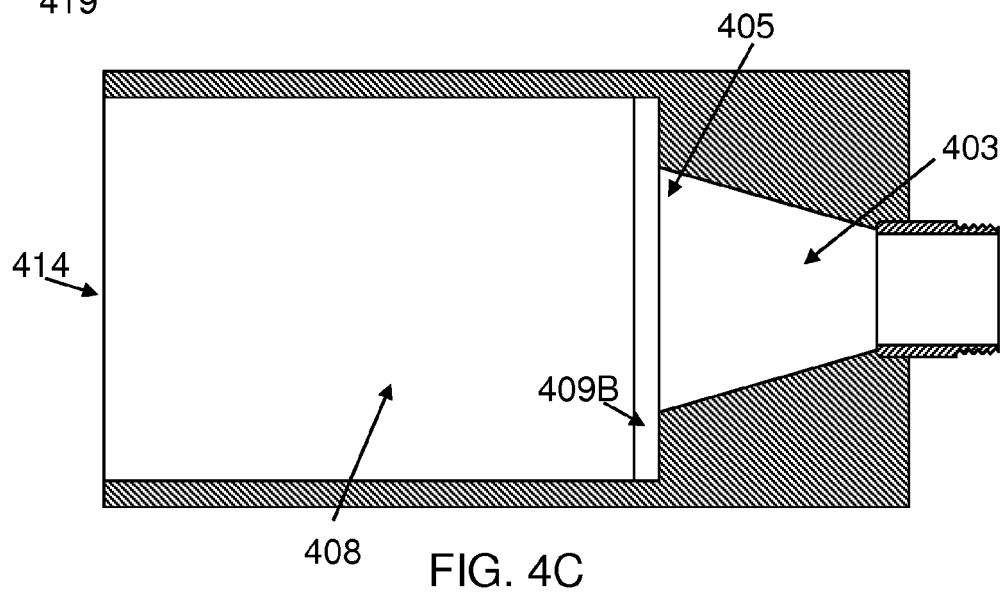

JET ASSISTED TUBELESS TIRE SEATING DEVICE

CROSS-REFERENCE TO RELATED APPLICATIONS

This application claims the benefit of and priority to U.S. Provisional Application 61/342,316 filed Apr. 14, 2010 which is incorporated herein by reference in its entirety.

BACKGROUND

1. Technical Field

The present subject matter relates to tools. More specifically, the present subject matter relates to a tool for seating a tubeless tire on a rim.

2. Description of Related Art

Many tires for automobiles, trucks and other equipment are designed to be mounted on wheels or rims without using a tube. The tire may be impervious to air with a bead around the inner edges of the tire designed to press against a lip of the rim to create an air-tight seal so that the combination of the tire and rim may be able to hold pressurized air or other gases. The rim may include a valve stem that may be used to inflate the tire.

After a tire is first mounted on a rim, the bead of the tire may not press tightly against the lip of the rim so that no air-tight cavity is created. In some cases, especially for smaller tires, enough air may be injected through the valve stem to create a pressure differential between the air inside the tire and the outside air so that, even though air may be escaping between the tire and the rim, the bead of the tire is pressed against the rim to create a seal. This may be referred to as seating the tire on the rim. Seating the tire on the rim allows the tire to be pressurized. But in some cases, especially with larger tires, it is just not possible to seat the tire by injecting air through the valve stem of the rim.

It is well known in the art that it may be possible to blow a high volume of air between the rim and the bead of the tire, creating the pressure differential between the pressure of the air in the tire and the outside air pressure, thereby seating the tire on the rim. Devices to accomplish this generally include a large, yet portable, pressurized air tank with a valve leading to a discharge barrel. The discharge barrel is typically a solid, leakproof metal tube rigidly connected to extend from the tank. The tank and discharge barrel may be positioned to blow a high volume of air from the pressurized air tank into the tire. The tank of conventional devices must be sized to hold enough air at a high enough pressure to expand the tire against the rim, and then completely fill the volume of the tire to a pressure greater than the atmospheric pressure in order to seat the tire against the rim. This may lead to a large unwieldy air tank and/or dangerously high pressures to accomplish this for large tires.

SUMMARY

According to various embodiments a nozzle for seating a tubeless tire on a rim using pressurized gas includes an outlet and a jet configured to accept pressurized gas and emit a stream of gas through an orifice into a chamber in the nozzle. The chamber extends into the nozzle from the outlet and is situated to allow the stream of gas to enter the chamber. The chamber has a cross sectional area that is larger than the orifice at a point near where the stream of gas enters the chamber if the cross-sectional area is measured in a direction substantially perpendicularly to a direction of flow of the stream of gas as it is emitted from the orifice. At least one air intake port is also included and is situated to allow air to enter the chamber from outside the nozzle and be emitted from the outlet if the stream of gas is flowing from the orifice, through the chamber and out of the outlet.

The nozzle may be used in a system including an air tank and a valve that controls a flow of pressurized gas from the air tank to the nozzle. A method of seating a tire on a rim includes positioning a nozzle to blow gas between a lip of a rim and a bead of a tire mounted on the rim and providing pressurized gas to an orifice within the nozzle. A stream of gas emitted from the orifice enters a chamber within the nozzle and draws air from outside of the nozzle through at least one air intake port. Air is blown out of an outlet of the nozzle into the tire between the lip of the rim and the bead of the tire causing the bead of the tire to be seated against the rim of the tire. At least some of the air emitted from the outlet comes from the at least one air intake port.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings:

FIGS. 4A-C show an alternative embodiment of a tire seating nozzle;

DETAILED DESCRIPTION

The present inventor recognized a problem with conventional design. Namely, the conventional designs feature a tank size that is either too large (for sufficient air volume) or too heavily reinforced (for sufficient pressure) in order to attain a burst of air sufficient to mount a tubeless tire on a wheel rim. The inventor recognized the benefits of being able to use a smaller more easily portable tank. The present invention alters the design of a conventional nozzle to provide a higher speed burst and greater volume of air into the tire for a given tank size. In this way nozzles according to the various embodiments disclosed herein can be used with smaller, more easily portable, sized tanks.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Mounting a tire refers to the act of placing a tire on a rim by sliding both beads of the tire over the rim so that the tire is on the rim with both beads between the two lips of the rim. Seating a tire refers to placing the beads of the tire against the lips of the rim, creating a seal and allowing the tire to be inflated to a desired pressure. For the purposes of this specification and claims, a tire is first mounted on the rim before the tire may be seated. With conventional devices it can be quite difficult to seat the tire on a rim so it can be inflated due to the gap between the tire and the rim once the tire has been mounted. Reference now is made in detail to the examples illustrated in the accompanying drawings and discussed below.

Figure 1A:
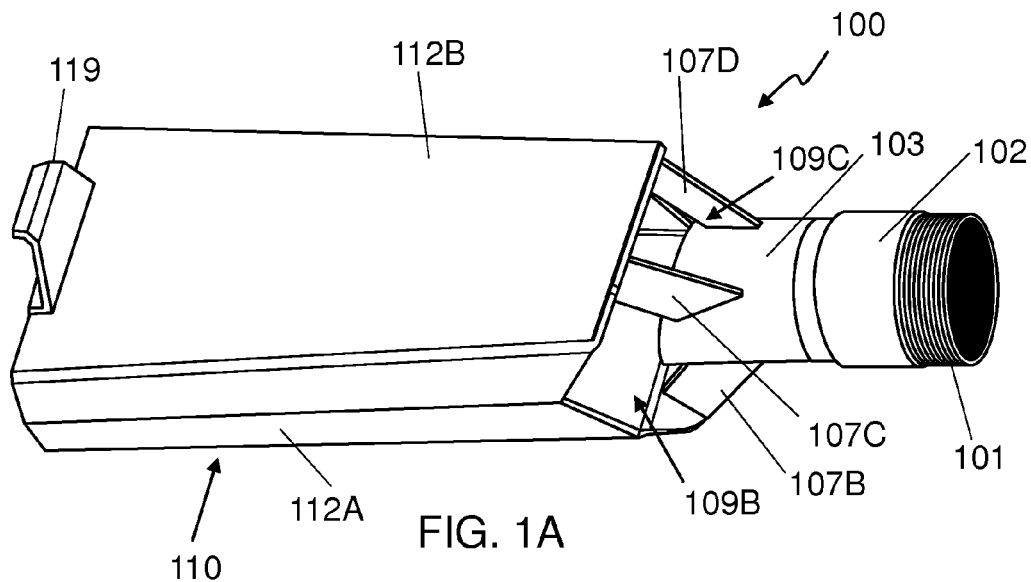
FIGS. 1A and 1B show isometric views of an embodiment of a tire seating nozzle.
Figure 1B:
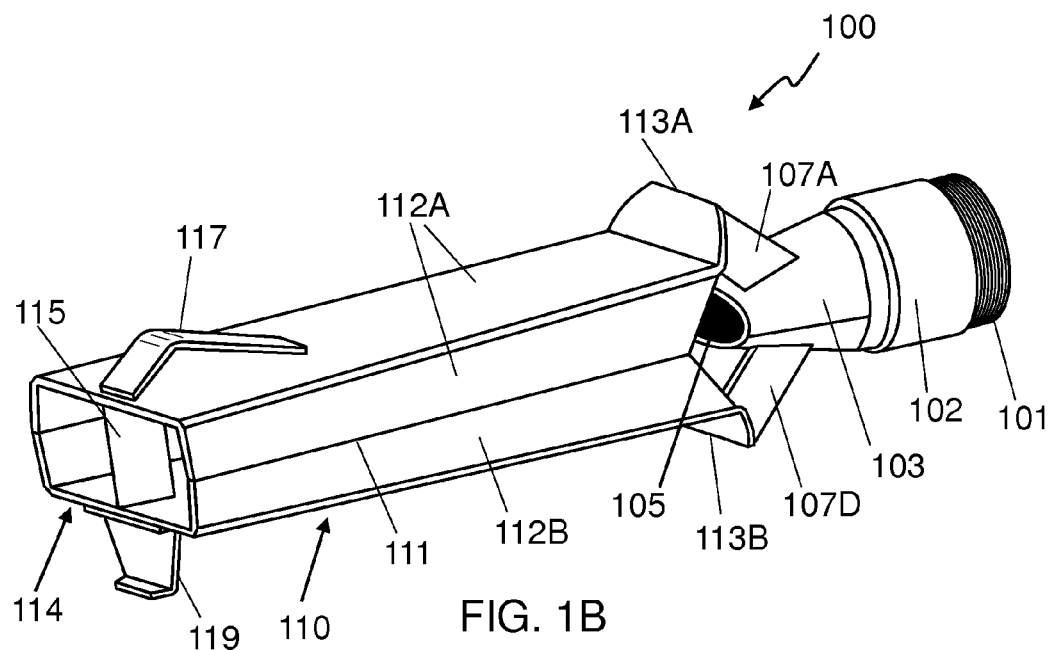

FIGS. 1A and 1B show isometric views of an embodiment of a tire seating nozzle 100. The tire seating nozzle 100 may be built in various ways and of various materials. The nozzle 100 may be built from several pieces and assembled into a rigid unit. The various pieces may be constructed from sheet metal such as steel, aluminum or other metal or may be molded or fabricated from engineering plastics or cast from metal. Any construction method may be used that is suitable for the application.

Most of the various pieces described below for the embodiment shown for nozzle 100 may be fabricated from 1.5 millimeter (mm) thick sheet steel although the coupling 102 with threads 101 that may be purchased as a finished part or constructed using techniques suitable for making high pressure couplings such as casting or extruding followed by a machining process to fabricate the screw threads. Other similar embodiments may use thicker or thinner steel or a different metal depending on the application and desired size of the nozzle 100.

The various pieces of the nozzle 100 may be assembled and attached to one another using any suitable technique including, but not limited to welding, brazing, soldering, gluing, or other attachment method. The assembled nozzle 100 may be painted, plated, powder-coated, or otherwise treated to help the nozzle 100 resist corrosion and/or provide for a pleasing appearance.

Figure 2A:
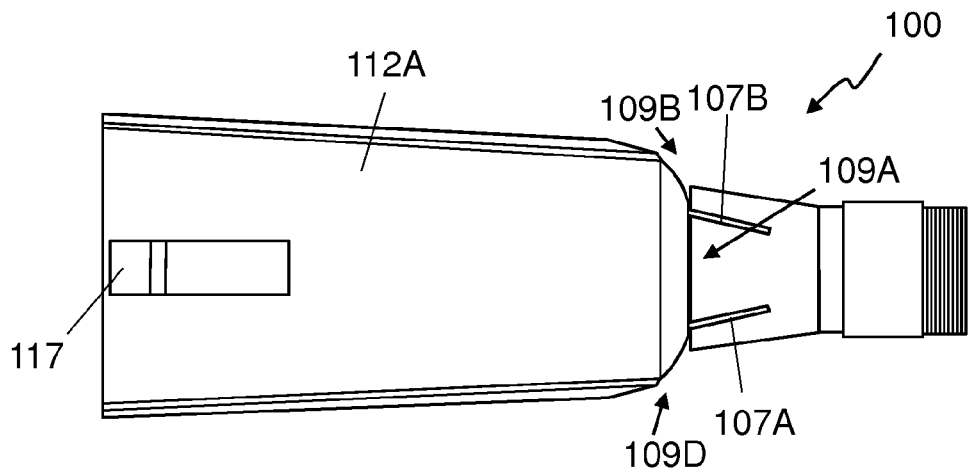
FIGS. 2A-2E show bottom, side, top, front and rear views of the tire seating nozzle of FIG. 1.
Figure 2B:
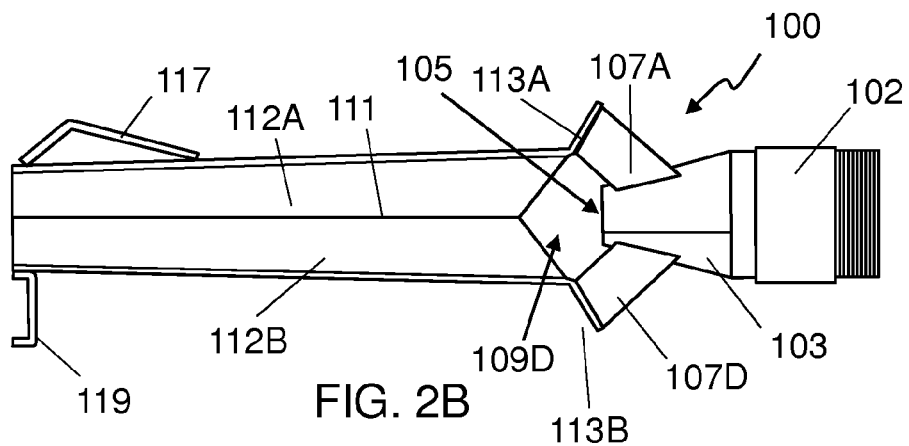
Figure 2C:
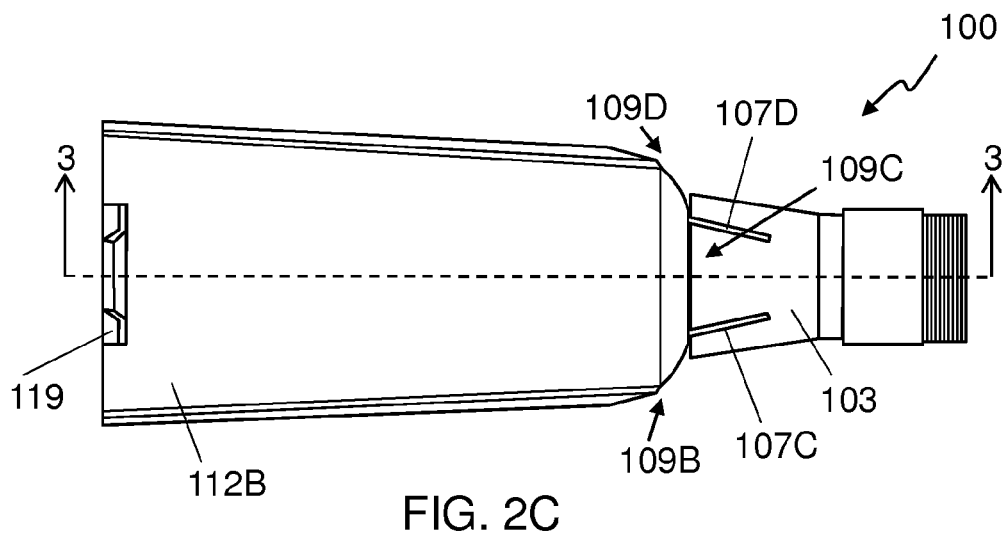
Figure 2D:
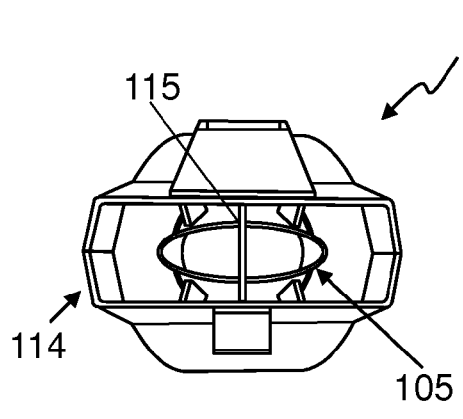
Figure 2E:
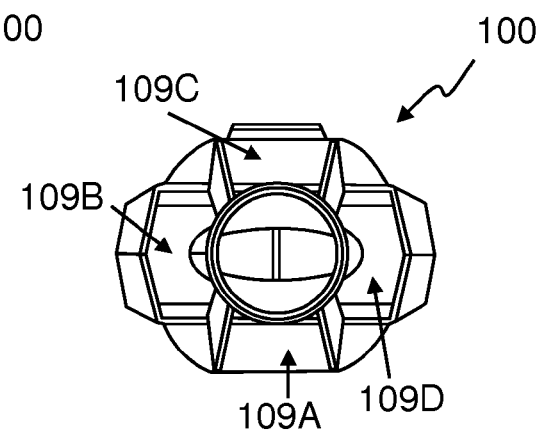
Figure 3:
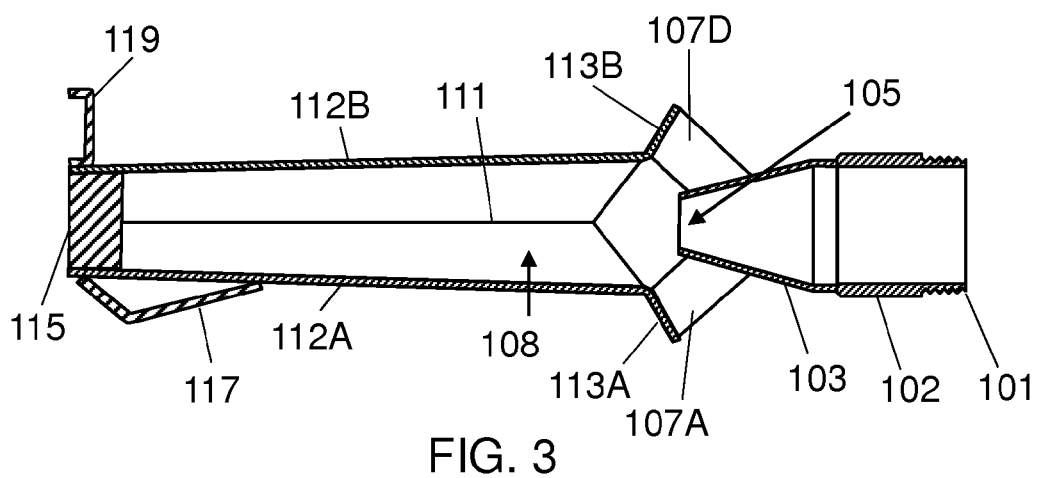
FIG. 3 shows a cross-sectional view of the tire seating nozzle of FIG. 1.

FIG. 1A shows an isometric view of the nozzle 100 from a position behind and above the nozzle 100. FIG. 1B shows an isometric view of the nozzle 100 from a position in front of and below the nozzle 100. FIG. 2A shows a bottom view of the nozzle 100. FIG. 2B shows a side view of the nozzle 100. FIG. 2C shows a top view of the nozzle 100 and also shows a position of the cross-sectional view shown in FIG. 3. FIG. 2D shows a front view of the nozzle 100. FIG. 2E shows a rear view of the nozzle 100. FIG. 3 shows a cross sectional view of the nozzle 100 at the position 3-3 of FIG. 2C. The following discussion may be applied to any of FIGS. 1A-B, 2A-E and/or FIG. 3. Not every part is identified in every view even if it is visible, but enough parts are labeled in the various views to allow one skilled in the art to clearly identify the various parts and how the various parts may connect and/or interact.

The nozzle 100 may include a coupling 102 that may be used to connect the nozzle 100 to a source of pressurized gas. Other embodiments may use other types of connections to a source of pressurized gas including, but not limited to a quick-release coupling, a bayonet type coupling, welding to a pipe or tube, gluing to a pipe or tube, a compression fitting, or other attachment means. The coupling 102 may be attached to an input aperture of a jet nozzle or jet 103 creating an air-tight seal between the coupling 102 and the jet 103 in most embodiments although some leakage may be acceptable. An orifice 105 is located at the opposite end of the jet 103 from the input aperture. The jet 103 and orifice 105 are configured to emit a stream of gas if pressurized gas is introduced into the coupler 102. In many embodiments, the orifice 105 may be smaller than the input aperture of the jet 103 to provide a higher velocity stream of gas than the velocity of the pressurized gas entering the coupler 102 and input aperture of the jet 103. In various embodiments, the threads 101, the coupling 102 and the jet 103 may either be separate parts connected together to form an air tight seal, or may be one solid part, e.g., cast and machined from metal or other material.

A nozzle body 110 may be fabricated from two halves, the nozzle body bottom half 112A and the nozzle body top half 112B. The two halves 112A, 112B may be alike and built to the same specifications. The two halves 112A, 112B may be joined together at seam 111 to create a chamber 108 between the two halves 112A, 112B. At one end of the nozzle body 110, a nozzle outlet 114 may be created and at the other end of the nozzle body 110, the nozzle body bottom half 112A has bottom attachment lip 113A and the nozzle body top half 112B has a top attachment lip 113B. In some embodiments, a nozzle brace 115 may be included at the outlet 114 to help provide strength to the outlet 114 and keep the outlet 114 from being bent as it is used. In some embodiments the nozzle body 110 may be formed from one solid piece, either with one seam or with no seams, rather than being assembled from the two halves 112A and 112B.

The nozzle body 110 may be attached to the jet 103 using four attachment braces 107A-D and situated so that the stream of gas emitted from the jet 103 enters the chamber 108. This may be seen in the cross-section depicted in FIG. 3. Two attachment braces 107A, 107B may connect the bottom attachment lip 113A to the jet 103 and the other two attachment braces 107C, 107D may connect the top attachment lip 113B to the jet 103. The orifice 105 may be located at a location near the plane passing through the outer edges of the bottom and top attachment lips 113A, 113B and may be, in some embodiments, oriented substantially in-line with, meaning no more than a 45 degree angle with, the longitudinal axis of the nozzle body 110. The orifice 103 may be shaped to somewhat match the shape of the chamber 108 where the gas stream from the orifice 105 enters the chamber. In the embodiment shown, the chamber 108 has a flattened cross section that is wider than it is tall and the orifice 103 has an oval shape with the major axis of the oval lining up with the width of the chamber 108. The cross-sectional area of the chamber 108 measured perpendicular to the longitudinal axis of the nozzle body near where the stream of gas enters the chamber 108 may be larger than the orifice 105 and may be typically be 2-10 times larger to provide space for the air intake ports 109A-D. In some embodiments the cross-sectional area of the chamber 108 may be greater than 10 times larger than that of the orifice 105, for example, for embodiments using a higher pressure gas supply and/or using gases of greater density than air.

The air intake ports 109A-D are the openings defined by the bottom and top nozzle halves 112A, 112B, the attachment braces 107A-D and the jet 103. Air intake port 109A is located between attachment brace 107A and attachment brace 107B, air intake port 109B is located between attachment brace 107B and 107C, air intake port 109C is located between attachment brace 107C and attachment brace 107D, and air intake port 109D is located between attachment brace 107D and 107A. The combined area of the air intake ports 109A-D may be at least as large as the orifice 105 and may typically be 4-20 times larger. As mentioned above, some embodiments may feature a cross-sectional area of the chamber 108 that is greater than 20 times larger than that of the orifice 105, for example, for embodiments using a higher pressure gas supply and/or using gases of greater density than air.

The outlet 114 may typically be somewhat smaller than the maximum cross-sectional area of the chamber 108 although in some embodiments, the chamber 108 may have a constant cross-sectional area from the orifice 105 to the outlet 114, or the outlet 114 may be somewhat larger than the cross-sectional area of the chamber 108. In many embodiments, the chamber 108 may flatten as it nears the outlet 114 to provide a more suitable shape for the nozzle to be positioned between the tire and the rim. In some embodiments, the outlet 114 may have an area that is between 50% and 100% of the maximum cross-sectional area of the chamber 108, which in many embodiments may be near where the stream of gas from the orifice 105 enters the chamber 108.

A rim bracket 119 may be attached to the nozzle body top half 112B near the outlet 114 that may be useful in positioning the nozzle 100 properly between the rim and the tire. A tire bumper 117 may be attached to the nozzle body bottom half 112A to help push the tire away from the rim to provide space for air to enter into the tire. Some embodiments may not have the tire bumper 117.

Various embodiments of the nozzle 100 may be built with different sizes and geometries depending on the targeted tire sizes and gas pressures being supported. For example, one embodiment targets tires sizes typical of commercial truck tires. This embodiment may have the following approximate dimensions:

Inside Diameter of the Coupler 102 . . . 42 mm
Width of Orifice 103 . . . 54 mm
Height of Orifice 103 . . . 18 mm
Width of Chamber 108 near Orifice 103 . . . 89 mm
Height of Chamber 108 near Orifice 103 . . . 43 mm
Length of Nozzle Body 110 . . . 200 mm
Width of Nozzle Outlet 114 . . . 106 mm
Height of Nozzle Outlet 114 . . . 35 mm
Overall Length of Nozzle 100 . . . 310 mm
Overall Width of Nozzle 100 . . . 106 mm
Overall Height of Nozzle 100 . . . 88 mm Some embodiments may provide multiple nozzle outlets 114 directed between a tire and a rim, or in some implementations, multiple nozzles 100 which are each directed to provide a burst of air between a tire and a rim. For example, in one embodiment a tire machine—that is, a machine for mounting a tire on a rim—is fitted with multiple nozzles 100, each of which is configured to blow a burst of air in between a tire and a rim in order to seat the tire on the rim. In such embodiments, the multiple nozzles 100 may be configured as part of the clamps holding the wheel, adjacent the clamps, or in between the clamps holding the wheel in place while the tire is mounted.

FIG. 4A shows an isometric view of an alternative embodiment of a tire seating nozzle 400. FIG. 4B shows a cross-sectional side view through the longitudinal axis of the nozzle 400 and FIG. 4C shows a cross-sectional top view through the longitudinal axis of the nozzle 400. Nozzle 400 may be molded from engineering plastic or cast from metal as a single piece or may be assembled from multiple pieces that may be molded, cast, or fabricated by some other method.

The coupling 402 may be an integrated part of the single piece nozzle 400 with the threads 401 created with a separate machining operation or molded directly in. Other embodiments may attach a separate coupling 402 to the nozzle body 410. The coupling 402 may direct pressurized gas to the jet 403 to emit a stream of gas through the orifice 405 into the chamber 408. Bottom air intake port 409A and top air intake port 409B allow air to enter the chamber from outside of the nozzle 400 and to be emitted, along with the stream of gas, through the output 414. Other embodiments may have additional air intake ports on the sides of the nozzle body 410. A rim bracket 419 may be attached to the top of the nozzle body 410 near the outlet 414.

Figure 5A:
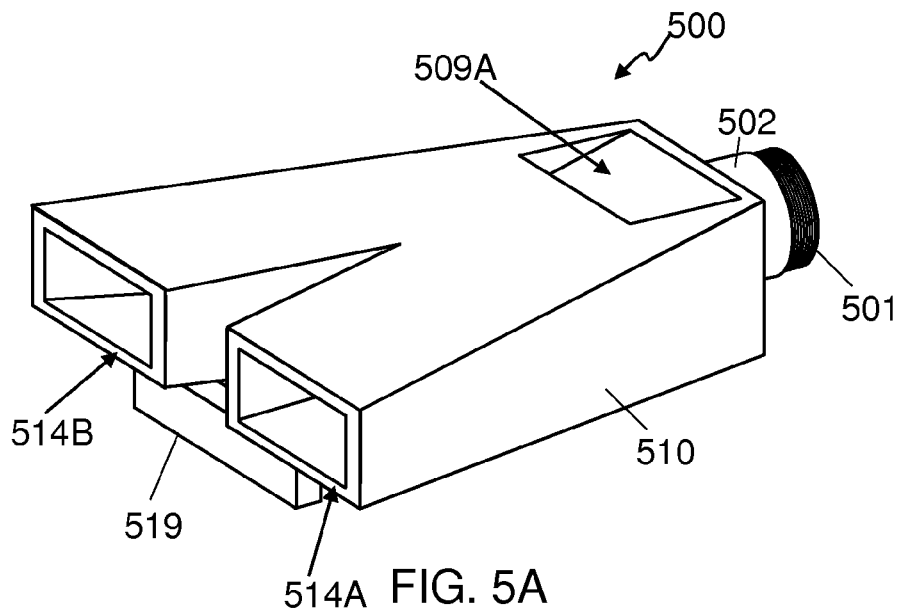
FIGS. 5A-C show another alternative embodiment of a tire seating nozzle.
Figure 5B:
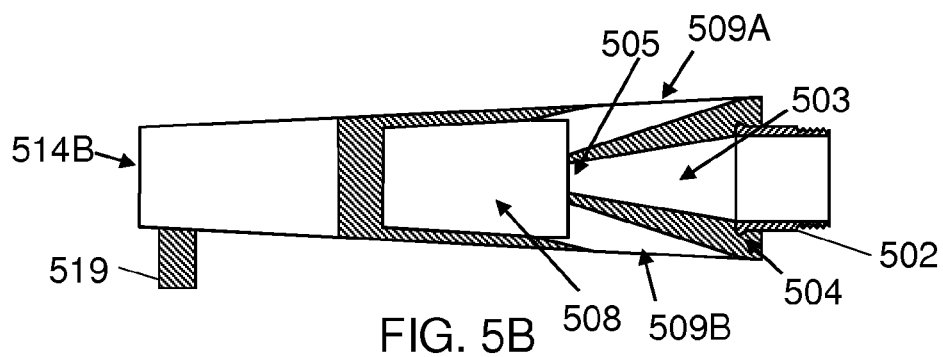
Figure 5C:
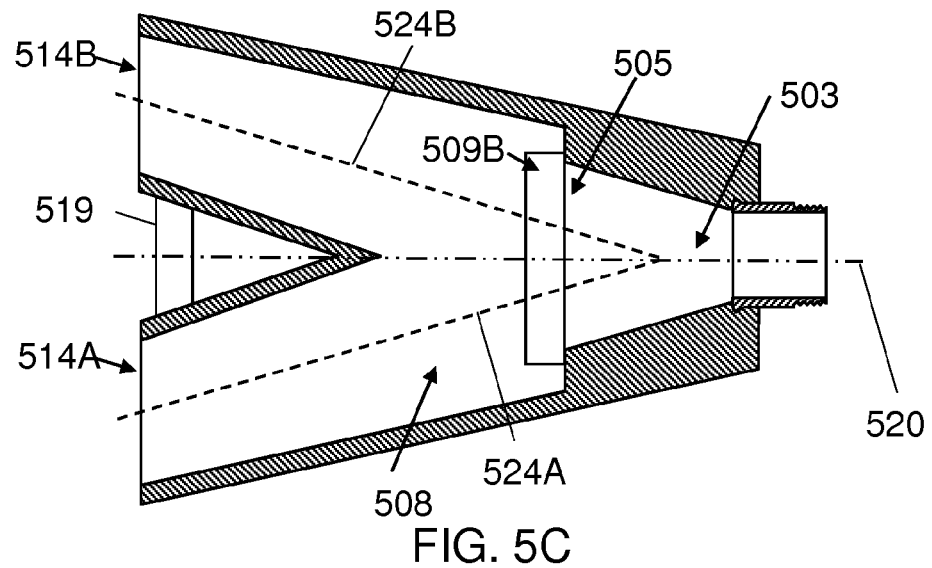

FIG. 5A shows an isometric view of another alternative embodiment of a tire seating nozzle 500. FIG. 5B shows a cross-sectional side view through the longitudinal axis of the nozzle 500 and FIG. 5C shows a cross-sectional top view through the longitudinal axis of the nozzle 500. Nozzle 500 may be created using halves of the nozzle body 510 molded from an engineering plastic or cast from metal as two identical halves that may be welded, bolted, glued or otherwise attached, or may be molded, cast, or fabricated by some other method.

The coupling 502 with threads 501 may have a lip 504 extending outward radially at the end opposite from the threads 501. The two halves of the nozzle body 510 may capture the lip 504 of the coupling 502 to hold it securely in place as it is assembled so that the pressure created by the pressurized gas does not pop the coupling out of the nozzle body 510. The coupling 502 may direct pressurized gas to the jet 503 to emit a stream of gas through the orifice 505 into the chamber 508. Bottom air intake port 509A and top air intake port 509B allow air to enter the chamber 508 from outside of the nozzle 500. A rim bracket 519 may be attached to the top of the nozzle body 510 near the outlets 514A, 514B.

The outlet of this embodiment is divided into the left nozzle outlet 514A and the right nozzle outlet 514B. The two nozzle outlets 514A, 514B may emit air taken in through the air intake ports 509A, 509B, along with the stream of gas from the orifice 505. The air may be emitted from the two nozzle outlets 514A, 514B in a direction generally in line with the longitudinal axes 524A, 524B of the each nozzle outlet 514A, 514B. The left nozzle outlet 514A has a left nozzle longitudinal axis 524A that may form an angle with the right nozzle longitudinal axis 524B of the right output nozzle 514B. The overall longitudinal axis 520 of the nozzle 500 may go through the center of the coupling 502, the center of the orifice 505 and between the center of the two nozzle outlets 514A, 514B and be approximately in line with the direction of the stream of gas emitted from the orifice 505. The overall longitudinal axis 520 may approximately bisect the angle created between the left nozzle longitudinal axis 524A and the right nozzle longitudinal axis 524B. Approximately bisecting the angle may be interpreted as the overall longitudinal axis 520 being within 60 degrees of being in the same plane as the two nozzle longitudinal axes 524A, 524B, and the projection of the overall longitudinal axis 520 onto the plane of the nozzle longitudinal axes 524A, 524B being between the two nozzle longitudinal axes. The angle between the two nozzle longitudinal axes 524A, 524B may usually be less than about 120 degrees and in many embodiments may be between about 20 and about 60 degrees.

Other embodiments may separate the outlet into several outlet ports and others may provide an air plenum shaped to match the curvature of the rim with several outlet ports along the plenum to distribute the air blown into the tire over a wider area. Any configuration may be used for the outlet of the nozzle.

Figure 6:
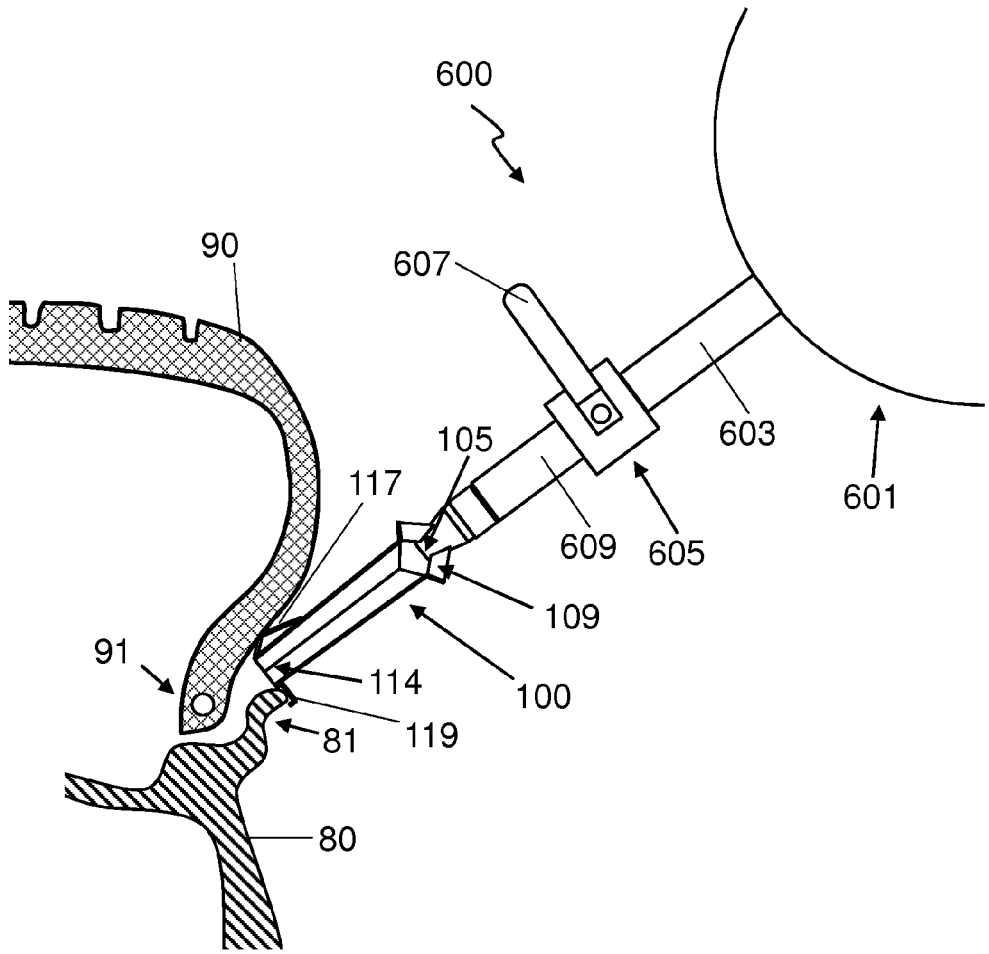
FIG. 6 shows an embodiment of a tire seating system using the tire seating nozzle of FIG. 1.

FIG. 6 shows an embodiment of a tire seating system 600 using the tire seating nozzle 100. A cross-sectional view of a tire 90 mounted on a tire rim 80 shows the application of the tire seating system 600. The tire seating system 600 includes a tank 601 for holding a pressurized gas, a valve 605 that may be coupled to the tank 601 using an input coupler 603, and the tire seating nozzle 100 that may be coupled to the valve 605 using an output coupler 609. In some embodiments, the valve may be mounted directly on or inside the tank 601 so that no input coupler 603 is used. In some embodiments the nozzle 100 may be directly coupled to the valve 605 so that no output coupler 609 is used.

The tank 601 may be rated for any pressure level but in many embodiments the pressure rating may be less than 150 pounds per square inch (psi) for safety reasons. Any size tank 601 may be used, depending on the tire sizes of the application and the pressure of the gas used but most embodiments may use a tank 601 of less than 10 gallons and one embodiment may use a 5 gallon tank 601. Because the nozzle 100 emits more air than it takes in from the tank 601 due to the additional air brought in through the air intake ports, the tank 601 may be smaller and/or at a lower pressure than previous tire seating systems have used. In one embodiment, the tank 601 may be less than about 4 gallons and be rated for about 130 psi to allow for a typical operating pressure of about 100 psi or less. Other embodiments may use a 3 gallon tank, or in some embodiments, various sizes smaller than three gallons, e.g., 2.5 gallons, 2 gallons, 1.5 gallons, 1 gallon, 0.5 gallon, or smaller. Typically, compressed air may be used as the pressurized gas in the tank 601 but in some embodiments, other pressurized gases, especially inert gases, may be used to fill the tank 601, including, but not limited to carbon dioxide ($CO_2$), Nitrogen ($N_2$), Argon (Ar) or other gases. In most embodiments, the tank 601 may include an input valve used to fill the tank 601 from a source of pressurized gas and a pressure gauge to measure the internal pressure of the tank 601. Some embodiments may also include a handle or mounting brackets on the tank.

The valve 605 may have a closed position where the valve 605 is sealed and allow no pressurized gas, or very little pressurized gas, to pass through the valve 605. In most embodiments, the valve 605 may be a high flow rate valve with a minimum internal aperture that is about the same as the area of the input and/or output area of the valve 605. In some embodiments, the valve may have about a 42 mm diameter input and output with a minimum internal flow aperture of greater than 1200 mm$^2$. The valve 605 may be mechanically actuated with a lever 607 that may be used to open and close the valve 605. In one embodiment, the valve 605 may be a butterfly valve and in another embodiment, the valve 605 may be a ball valve. In other embodiments, the valve 605 may be actuated electrically, hydraulically, or pneumatically. In some embodiments, the valve 605 may be a rapid release valve that allows the valve 605 to go from closed to fully open very quickly, more quickly than could be done by a human operating a lever or other mechanical actuation mechanism. In some embodiments, the valve may go from closed to fully open in less than 50 milliseconds. The valve 605 may be of any type or actuated in any way but in most embodiments should be designed to open quickly and provide for a high flow rate of pressurized gas from the tank 601 to the nozzle 100.

The nozzle 100 accepts the pressurized gas from the valve 605 through its coupling 102 and into the jet 103. The pressurized gas may be emitted from the orifice 105 as a stream of gas into the chamber 108 of the nozzle 100. Air may then be drawn into the air intake ports 109 of the nozzle 100 due to the Venturi effect. The gas from the tank 601 and the air from the air intake ports 109 may then be blown out of the outlet 114 of the nozzle 100.

In use, the nozzle 100 of the tire seating system 600 may be positioned to blow air between the lip 81 of the rim 80 and the bead 91 of the tire 90 mounted on the rim 80. A rim bracket 119 may catch on the lip 81 of the rim 80 to help the user properly position tire seating system 600. A tire bumper 117 may push the tire 90 away from the edge of the outlet 114 to also help with getting the tire seating system 600 in the proper position.

The gas and air may be blown out of the outlet 114 of the nozzle 100 and between the lip 81 of the rim 80 and the bead 91 of the tire 90 into the tire 90. The large volume of air that may be quickly blown into the tire 90 may create a pressure differential between the pressure of the air inside the tire 90 and the ambient air pressure, pushing the bead 91 against the lip 81 to seal the tire 90 to the rim 80 and allowing the tire 90 to be fully inflated to a proper operating pressure. In some embodiments, a pressurized air source may be connected to the valve stem of the rim 80 while actuating the valve 605 and seating the tire 90 on the rim 80 to facilitate the operation of inflating the tire and provide yet another source of air to help create the pressure differential between the inside of the tire 90 and the outside air.

Figure 7:
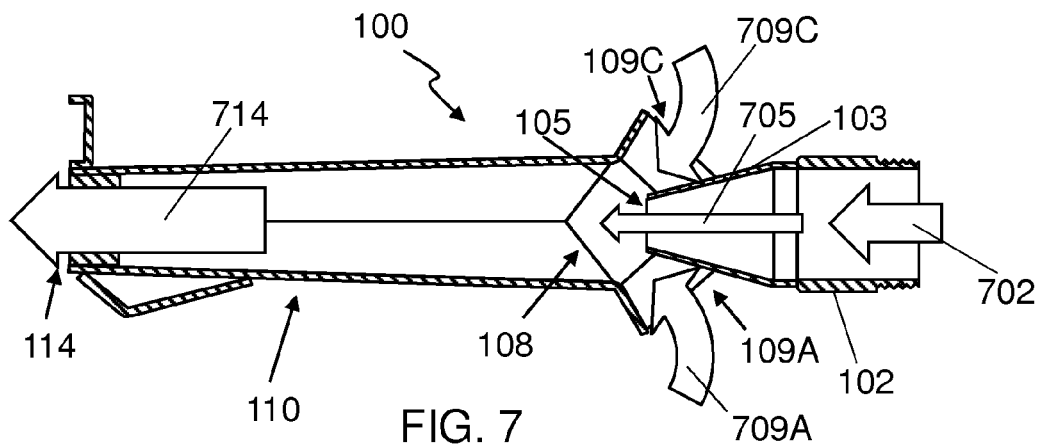
FIG. 7 shows gas flowing through a cross-sectional view of the tire seating nozzle of FIG. 1.

FIG. 7 shows gas and air flowing through a cross-sectional view of the tire seating nozzle 100. Pressurized gas 702 may enter the coupler 102 from a source of pressurized gas such as the tank 601 of the tire seating system 600. As the pressurized gas 702 and flows through the jet 103, the cross-sectional area of the jet may narrow and the speed of the gas flowing through the jet 103 may increase due to the law of conservation of matter. As the gas exits the orifice 105, it creates a first stream of gas 705. The stream of gas 705 is flowing much faster than the air surrounding the nozzle 100 creating a lower pressure than the outside air due to Bernoulli's principle. This creates a pressure differential between the chamber 108 and the outside air causing air to enter through the air intake ports 109A-109D with air flow 709A entering through air intake port 109A and air flow 709C entering through air intake port 109C. Air may also enter through air intake port 109B and air intake port 109D but those air flows are not shown in FIG. 7. The effect of drawing air into a chamber through the air intake ports 109A-D as a stream of fluid 705 enters the chamber 108 may be known as the Venturi effect.

The stream of gas 705 coming from the orifice 105 may mix with the air flows 709A, 709C as they flow down the chamber 108 through the nozzle body 110. The mix of air and gas 714 may then flow out of the output 114 as a second stream of gas. The second stream of gas 714 includes the first stream of gas 705 and the air entering through the air intake ports 109A-109D. The total mass of the air and gas 714 may be larger than the mass of pressurized gas 702 that enters the coupling 102 due to air flows 709A, 709C that may add to the mass of the pressurized gas 702.

Various embodiments of tire seating nozzles may have a wide variety of different configurations of air intake ports. There may be a wide variety of number of air intake ports, their shape, their total area, and their placement with respect to the orifice. Any variation that still creates a larger mass of gas and air being expelled from the outlet than the mass of gas that is provided at the coupling of the nozzle may be an acceptable embodiment. In the inventor's experience, one efficient orientation of the jet, orifice, chamber and air intake ports is that used for nozzle 100 as shown in the various drawings of FIGS. 1, 2, 3, 6 & 7. In that embodiment, the bottom air intake port 109A and the top air intake port 109C enter diagonally into the chamber 108 with the forward edge of the bottom air intake port 109A and the top air intake port 109C approximately even with the orifice 105. The side air intake ports 109B, 109D shown in FIG. 2A allow air to enter through the sides in front of the orifice 105. The ratio of the combined area of the air intake ports 109A-D to the area of the orifice may typically be about 5:1 to allow for a free flow of air to enter the chamber from outside the nozzle 100. Depending upon the tire size the device is intended for, the density of the gas being used, the pressure, and other design considerations this ratio may be larger or smaller in some embodiments. And while the height of the chamber 108 decreases from the end closest to the orifice 105 to the outlet 114 to more effectively blow are into the narrow slot between the bead 91 of the tire 90 and the lip 81 of the rim 80, the chamber 108 also widens so as not to decrease the cross-sectional area too much. In some embodiments of the nozzle 100, the outlet 114 is only about 5% smaller than the cross-sectional area of the chamber 108 near where the stream of gas from the orifice 105 enters the chamber 108.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements. The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "a port" may refer to a single port, two ports or any other number of ports. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6. In particular the use of "step of" in the claims is not intended to invoke the provision of 35 U.S.C. §112, ¶6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A nozzle for seating a tubeless tire on a rim using pressurized gas, the nozzle comprising:
    a jet configured to accept the pressurized gas and emit a first stream of gas through an orifice;
    an outlet suitable for directing a second stream of gas into a gap between the tubeless tire and the rim;
    a chamber extending into the nozzle from the outlet and situated to allow the stream of gas to enter the chamber, the chamber having a cross sectional area at a point near where the stream of gas enters the chamber that is larger than the orifice, said cross sectional area measured in a direction substantially perpendicularly to a direction of flow of the first stream of gas as it is emitted from the orifice; and
    at least one air intake port situated to allow air from outside the nozzle to enter the chamber and be emitted from the outlet if the stream of gas is flowing from the orifice, through the chamber and out of the outlet;
    wherein the second stream of gas comprises the first steam of gas and said air from outside the nozzle.

2. The nozzle of claim 1, wherein the air from outside the nozzle enters the chamber due to a Venturi effect in response to the first stream of gas.

3. The nozzle of claim 1, the outlet comprising:
    a first output port and a second output port;
    wherein an angle less than 120 degrees is created between longitudinal axes of the first output port and the second output port and said angle is approximately bisected by the direction of the flow of the stream of gas as it is emitted from the orifice.

4. The nozzle of claim 3, wherein said angle is between 20 degrees and 60 degrees.

5. The nozzle of claim 1, wherein an open area of the outlet is between 50% and about 100% of said cross-sectional area of the chamber near where the first stream of gas enters the chamber.

6. The nozzle of claim 1, wherein the outlet has a width of between 60 millimeters (mm) and 160 mm and a height of between 20 mm and 50 mm.

7. The nozzle of claim 1, further comprising:
    a rim bracket attached to the nozzle near the outlet;
    wherein the rim bracket is configured to catch on a lip of a tire rim if the nozzle is positioned between the tire rim and a tire mounted on the tire rim to blow air into tire.

8. The nozzle of claim 1, wherein a combined area of the at least one air intake port is at least as large as the orifice.

9. The nozzle of claim 1, wherein an input aperture of the jet is larger than the orifice.

10. The nozzle of claim 1, wherein the orifice has an area of at least 300 square millimeters.

11. A system for seating a tubeless tire on a rim comprising:
    a tank capable of holding pressurized gas;
    the nozzle of claim 1; and
    a valve;
    wherein an input of the valve is coupled to the tank and an outlet of the valve is coupled to the jet of the nozzle and the valve is configured to control a flow of gas from the air reservoir to the jet of the nozzle.

12. The system of claim 11, wherein the air reservoir has a volume of less than 4 gallons and is rated to hold gas at no more than about 130 pounds per square inch (psi).

13. The system of claim 11, wherein the valve is pneumatically actuated.

14. The system of claim 11, wherein the valve is mechanically actuated.

15. The system of claim 11, wherein the orifice has an area of at least 300 square millimeters and the valve has a minimum internal flow aperture with an area larger than the orifice.

16. The system of claim 11, wherein the valve is a rapid release valve.

17. A method for seating a tubeless tire on a rim, the method comprising:
- positioning a nozzle to allow the nozzle to blow a second stream of gas between a lip of a rim and a bead of a tire mounted on the rim;
- providing pressurized gas to an orifice within the nozzle, wherein a first stream of gas emitted from the orifice enters a chamber within the nozzle and draws air from outside of the nozzle through at least one air intake port; and
- blowing the second stream of gas out of an outlet of the nozzle into the tire between the lip of the rim and the bead of the tire causing the bead of the tire to be seated against the rim of the tire, wherein at least some of the second stream of gas emitted from the outlet comes from the at least one air intake port.

18. The method of claim 17, wherein the pressurized gas has a pressure of less than about 130 pounds per square inch (psi); and
- wherein the air from the outside of the nozzle enters the chamber through said at least one air intake port due to the Venturi effect.

19. The method of claim 17, wherein the orifice has an area of at least 300 square millimeters and the pressured gas is provided from a tank through a passage having an internal cross-sectional area larger than the orifice.

* * * * *